US008761990B2

(12) United States Patent
Chrysanthakopoulos et al.

(10) Patent No.: US 8,761,990 B2
(45) Date of Patent: Jun. 24, 2014

(54) SEMI-AUTONOMOUS MOBILE DEVICE DRIVING WITH OBSTACLE AVOIDANCE

(75) Inventors: Georgios Chrysanthakopoulos, Seattle, WA (US); Michael J. Wyrzykowski, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 13/076,032

(22) Filed: Mar. 30, 2011

(65) Prior Publication Data
US 2012/0253582 A1    Oct. 4, 2012

(51) Int. Cl.
*G01C 22/00* (2006.01)
(52) U.S. Cl.
USPC ........ 701/26; 375/240.16; 700/259; 700/258; 700/254
(58) Field of Classification Search
USPC ............ 701/26, 487; 700/254, 259, 258; 901/47, 1, 46; 375/240.16, E7.123; 382/154, 285, 305; 348/43, 42, E13.06; 345/419
See application file for complete search history.

(56) References Cited

U.S. PATENT DOCUMENTS

| 7,623,676 | B2 | 11/2009 | Zhao et al. | |
|---|---|---|---|---|
| 2007/0297696 | A1 | 12/2007 | Hamza et al. | |
| 2009/0147238 | A1 | 6/2009 | Markov et al. | |
| 2009/0292468 | A1 | 11/2009 | Wu et al. | |
| 2011/0208357 | A1* | 8/2011 | Yamauchi | 700/258 |
| 2011/0216833 | A1* | 9/2011 | Chen et al. | 375/240.16 |
| 2012/0072021 | A1* | 3/2012 | Walser et al. | 700/254 |
| 2012/0185094 | A1* | 7/2012 | Rosenstein et al. | 700/259 |

OTHER PUBLICATIONS

Hebert, et al., "Experiments with Driving Modes for Urban Robots", Retrieved at <<http://www.ri.cmu.edu/pub_files/pub3/hebert_martial_1999_1/hebert_martial_1999_1.pdf>>, 1999, pp. 11.
Kim, et al., "Design and Calibration of a Multi-view TOF Sensor Fusion System", Retrieved at <<http://www.mpi-inf.mpg.de/~theobalt/TOF_CV_mvfuse_calib_final.pdf>>, Jun. 2008, pp. 7.
Kim, et al., "Multi-view Image and ToF Sensor Fusion for Dense 3D Reconstruction", Retrieved at http://www.mpi-inf.mpg.de/~theobalt/3dim09.pdf>>, 2010, pp. 8.
Gudmundsson, et al., "Fusion of Stereo Vision and Time-of-Flight Imaging for Improved 3D Estimation", Retrieved at <<http://citeseerx.ist.psu.edu/viewdoc/download?doi=10.1.1.115.482&rep=rep1&type=pdf>>, 2008, pp. 8.
Hoyer, et al., "An omnidirectional wheelchair with enhanced comfort features", Retrieved at <<http://people.bath.ac.uk/mpsmrh/icorr97/hoyer.pdf>>, 1997, pp. 4.

* cited by examiner

*Primary Examiner* — Behrang Badii
(74) *Attorney, Agent, or Firm* — Steve Wight; Carole Boelitz; Micky Minhas

(57) ABSTRACT

The subject disclosure is directed towards driving a robot or other mobile device safely through an environment by using a depth camera to obtain depth data, and then using the depth data for collision avoidance. Horizontal profile information may be built from the depth data, such as by collapsing a two-dimensional depth map into one-dimensional horizontal profile information. The horizontal profile information may be further processed by fusing the depth camera-detected obstacle data with any closer obstacle data as detected via infrared-based sensing and/or sonar-based sensing. Driving suggestions from a user or program are overridden as needed to avoid collisions, including by driving the robot towards an open space represented in the horizontal profile information, or stopping/slowing the robot as needed.

11 Claims, 7 Drawing Sheets

SEMI-AUTONOMOUS MOBILE DEVICE DRIVING WITH OBSTACLE AVOIDANCE

BACKGROUND

To more fully utilize a mobile device such as a consumer robot, users want to be able to remotely or locally drive (control the movement) of the mobile device, such as to drive the robot around the user's home. However, such control is challenging for various reasons.

One such reason is latency. For example, if latency larger than a small fraction of a second is present, the user may not be able to correct the device's path and speed, possibly resulting in a collision with an obstacle. Even if collisions do not occur, user latency causes a poorly controlled system, with the resulting path of the device not being smooth.

Another challenging aspect is safety, in that a user might not be able to react fast enough in a dynamic environment to avoid a collision. Even in a stationary environment, the user may be unable to react fast enough to avoid mishandling the device when attempting to control a fast moving device.

Still further, a mobile device should be easy to control. A user should not have to provide too many navigation commands to navigate the device through typical indoor/outdoor spaces. In tight spaces, or spaces with obstacles, however, a user currently needs to provide a large number of navigation commands, which is difficult to do, and thus the user likely has to slow the device down considerably to avoid collisions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a mobile device such as a robot semi-autonomously drives itself through an environment. The device uses driving suggestions from a user (or program), which are overridden as needed by collision avoidance technology, to avoid obstacles in the environment.

In one aspect, a depth camera (e.g., coupled to the robot) captures depth data, and a navigation mechanism processes the depth data into an obstacle map. Navigation logic drives the mobile device through the environment based upon the obstacle map to avoid colliding with any obstacle represented in the obstacle map. The depth data is captured and processed at a relatively fast frame rate, so the collisions are avoided even in an environment in which the obstacles are dynamically changing position and/or if the mobile device is rapidly moving.

In one aspect, profile information corresponding to the depth data is computed and used to avoid obstacles. Suggested driving commands are used to drive the mobile device through the environment until the profile information indicates an anticipated collision with an obstacle, at which time navigation logic takes action to avoid an actual collision. Taking the action may include slowing the mobile device linear speed and/or angular speed, driving the mobile device towards an open space represented in the profile information, or stopping the mobile device with respect to linear speed and/or angular speed. The mobile device may be stopped with respect to linear speed and slowed with respect to angular speed.

In one aspect, the profile information is built from the depth data, such as by collapsing a two-dimensional depth map into one-dimensional horizontal profile information by selecting the closest obstacle represented in each column. The horizontal profile information may be further processed by fusing the depth camera-detected obstacle data with any other closer obstacle data as detected via infrared-based sensing and/or sonar-based sensing.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards semi-autonomous driving of a mobile device (e.g., a robot), which is configured with obstacle avoidance based upon depth camera processing, and possibly additional sensors. The mobile device is generally controlled with sparse user directional suggestions, which are combined with the obstacle avoidance technology, to drive the device in a desired direction. In general, the device makes real time decisions at a high sampling rate (e.g., several times a second, such as with 70 ms frames) while the human user issues suggestions on direction and/or speed only when a course correction is desired.

The obstacle avoidance and other device operations overcome problems due to user latency, while providing safety and ease of use. As will be understood, obstacle avoidance avoids robot-caused collisions, even in a dynamic environment, however other safety aspects such as cliff-sensing (e.g., not driving the robot down a staircase) may be performed by other sensors in a known manner.

In general, the user only submits directional feedback when the device encounters a situation in which an ambiguous or otherwise uncertain (in terms of open space) direction change is available. In one aspect, the device is configured to autonomously avoid obstacles, while merging its next computed path with the last user direction. As a result, the device is able to navigate in tight spaces, or spaces with obstacles, even with no user directional feedback.

It should be understood that any of the examples herein are non-limiting. For one, while the device being driven is exemplified as a robot, it is understood that any mobile device, such as a vehicle, may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in controlling the movement of mobile devices in general.

Figure 1:
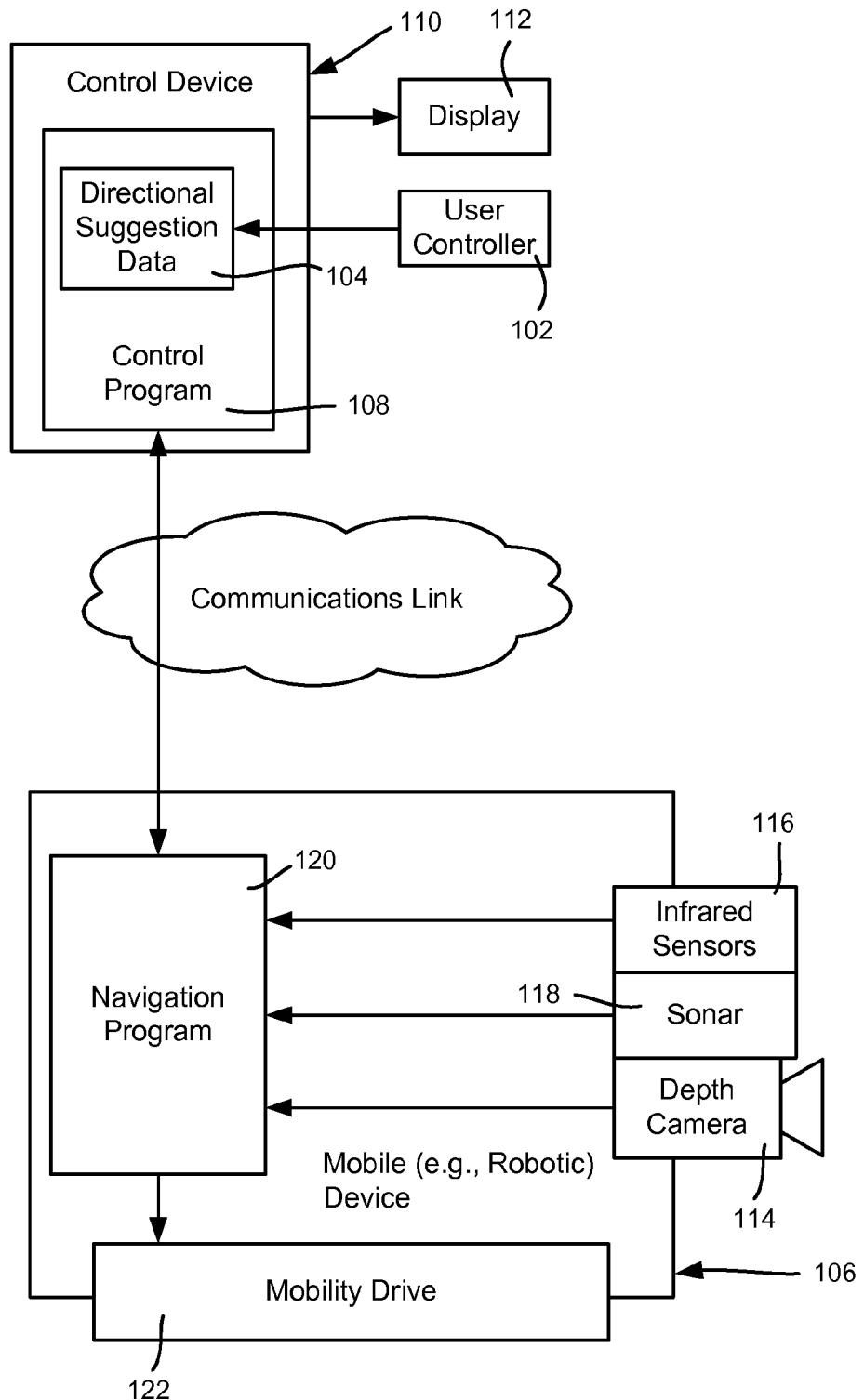
FIG. 1 is a block diagram representing example components of a system for navigating, based on user or program suggestions, a mobile device (e.g., robot) that is configured with collision avoidance.

FIG. 1 shows components of one example implementation in which a user via a user controller 102 provides input including directional suggestion data 104, (e.g., user commands in the form of rotational and linear speed increments) to drive a mobile device, e.g., a robotic device (robot) 106. The user communicates with the robot 106 through a control program 108 (e.g., an application) on a control device 110, such as a personal computer, mobile phone, game console, custom device controller, or other such device. Note that any of the user commands may be pre-programmed; for example, if a user wants to drive the robot to the middle of the kitchen, the user (or a timer set by the user, and so on) may select such a pre-programmed or device-learned set of commands, which are then provided to the robot (remotely or from within robot local memory) as if the user was issuing those commands.

The control program 108 may comprise a standalone application or may be embedded in a browser/operating system component. The control device 110 is typically coupled to a display 112, including by which the user can receive video or image data to view what the robot's video camera (which may be incorporated into the device's depth camera 114, such as in Microsoft® Kinect™ technology), if present, is currently capturing. The robot 106 may similarly be provided with a microphone by which the user may hear via device speakers what the robot 106 can audibly sense.

With respect to obstacle avoidance, as represented in FIG. 1 the robot 106 includes the depth camera 114. In one implementation, one depth camera uses triangulation, resulting in a blind spot problem in which the camera cannot sense obstacles that are too close, e.g., less than one-half meter away. To sense obstacles in this range, the robot 106 includes a plurality of infrared (IR) transmitters and sensors 116, e.g., three angled beams. As can be readily appreciated, in embodiments wherein the depth camera does not have such a blind spot, such as with time of flight depth cameras, the supplemental infrared sensing may be unnecessary.

Moreover, certain obstacles such as glass cannot be consistently sensed with a depth camera and/or supplemental IR sensors. A sonar mechanism (device) 118 is included in one implementation to provide for such obstacle sensing. As can be readily appreciated, other components, or less than all components shown in FIG. 1, may be present in a given implementation.

As described below, the various obstacle sensing inputs from the camera 114, infrared transmitters and sensors 116, sonar device 118 and/or any other suitable range detecting sensors are fed into a navigation mechanism (e.g., program) 120. In general, the navigation program 120 provides drive commands to a mobility drive 122; as described below, this may based on driving the device into an open space, e.g., comprising contiguous depth readings beyond a certain threshold (if any such open space exists), that is combined with driving commands that the user or a program suggests.

Figure 2:
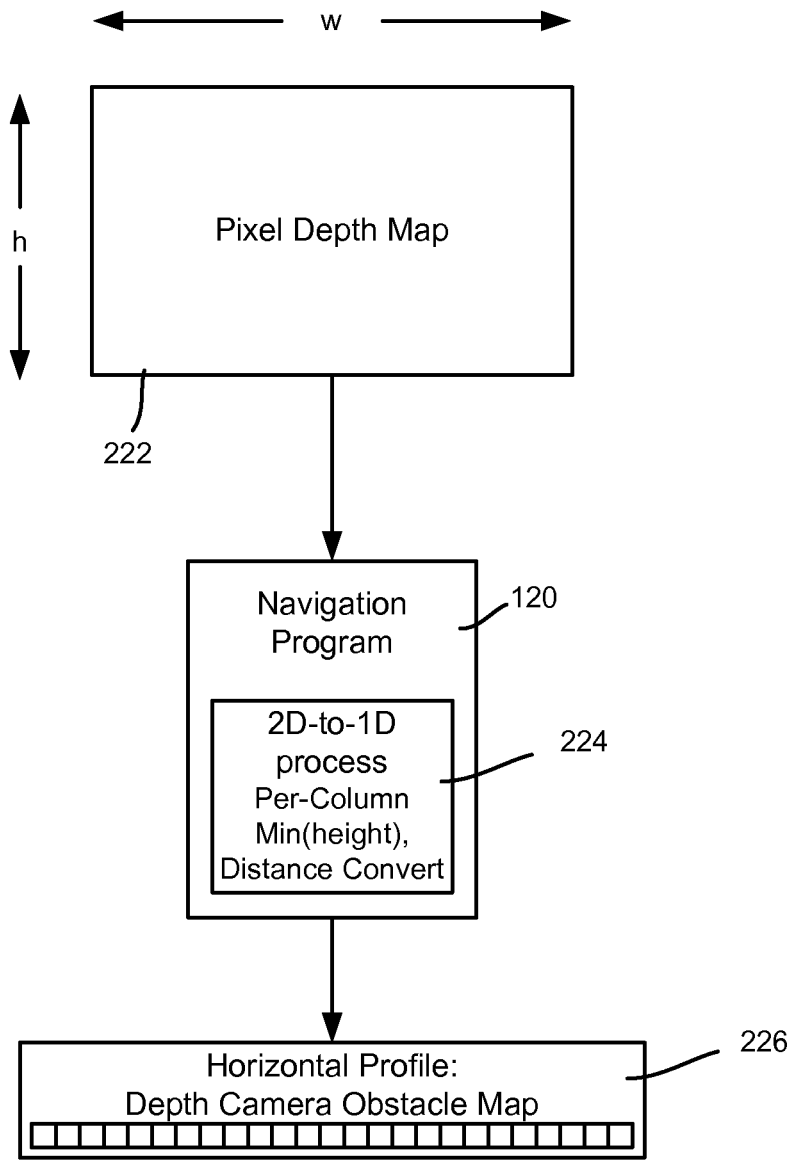
FIG. 2 is a block diagram representing example processing of two-dimensional depth data captured by a depth camera into a one-dimensional vector comprising horizontal profile information.

As is known, a depth camera such as provided in Microsoft® Kinect™ uses a depth and image (e.g., RGB) camera that provides a two-dimensional pixel map comprising R, G, B values (or the like, e.g., CMY values) and a depth value D for each frame. The R, G, B values may be filtered out, leaving a map of pixel depths, e.g., depth map 222 (FIG. 2). Note that separate image and depth cameras may capture such data, and thus the depth camera 114 of FIG. 1 may provide only a pixel depth map 222, directly without filtering.

FIG. 2 shows such a map 222, which may be processed (block 224) by the navigation program 120 into a 1D depth camera obstacle map 226. In one implementation, the depth camera obstacle map 226 is a one-dimensional (1D) vector/array processed (compressed) from the two-dimensional (2D) depth map 222 by maintaining only the closest obstacle in any column of pixels. For example, if the image is 320 pixels wide, the map comprises a vector 320 elements long, with each element comprising the minimum depth reading within that depth image column, thus describing the nearest potential obstacle. Note that this 1D mapping may be subject to other mathematical processing beyond the minimum, such as not considering an obstacle at a row height that the robot can easily traverse, so that, for example, the robot can travel from a hard floor to a carpet. Still other processing such as averaging, smoothing or otherwise combining depth values for a pixel over some number of frames, e.g., to prevent transient noise from being interpreted as an obstacle, may also be performed.

Another aspect of building the one-dimensional obstacle map 226 may be to convert the distances to simplified values, such as based on driving considerations. For example, a zero value may represent a distant obstacle (greater than 2.0 meters, up to full speed is acceptable), a one value may represent a closer, moderately distant obstacle (between 0.6 and 2.0 meters, slow down even if the user requests a higher speed), and two may represent a near obstacle (less than 0.6 meters, stop, and maybe rotate to find a way around the obstacle). More granular values may be used in the map, e.g., to correspond to drive speed differences such as very slow, slow, moderate, moderately fast, full speed, and so on. Alternatively, the actual values may be retained.

Once the one-dimensional obstacle map 226 is obtained, the navigation program 120 may use the map 226 to drive the robot towards an open space, e.g., one that corresponds to the user's suggested direction. For example, the user may provide a suggested "drive forward" command, whereby the navigation program 120 will determine an open space (e.g., the midpoint thereof) that is closest to the straight forward direction, and drive the robot in that direction. Note that the sampling rate is generally fast enough relative to the robot's maximum drive speed to adjust for dynamically changing conditions.

As described above, in an implementation in which other sensors are present, the data in the 1D depth camera obstacle map 226 may be fused with data from other sensors into a more comprehensive map, e.g., without blind spots resulting from near obstacles, and/or accounting for transparent obstacles. This fusing is performed before or converting to simplified values, or determining the midpoint of an open space, for example; (although it is feasible to change the simplified values if the IP sensor detects something closer than the simplified value suggests).

Figure 3:
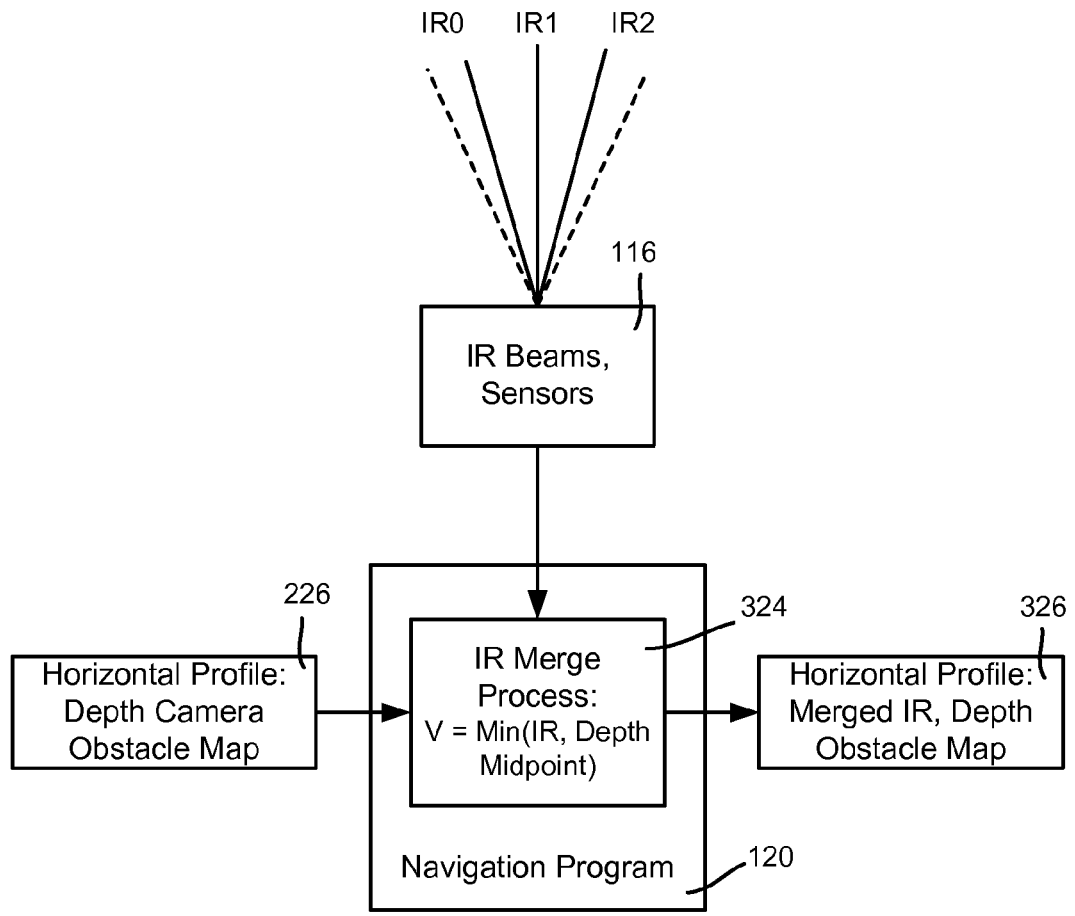
FIG. 3 is a block diagram representing example modification of horizontal profile information based upon infrared (IR)-based obstacle sensing.

FIG. 3 shows further processing of the depth camera obstacle map with any information detected by the IR sensors, which is meaningful at close distances. In general, an IR merge process 324 takes the minimum of any obstacle that each IR sensor detects versus what the depth camera sensed in one or more of the corresponding pixels at that angle. Note that because IR sensors have a very narrow field of view, only a portion of the vector being built (referred to as the horizontal profile) is modified, depending on the orientation of the IR sensor. For example, IR1 (within the depth camera field of view as represented by the dashed lines) represents one IR beam that points straight ahead, and thus a set of one or more entries (e.g., the vector center plus and minus some number of entries) that represent the straight ahead direction as captured by the depth camera may have each of its depth entries lowered in the merged IR, depth obstacle map 326 if the IR sensor senses a closer obstacle.

Figure 4:
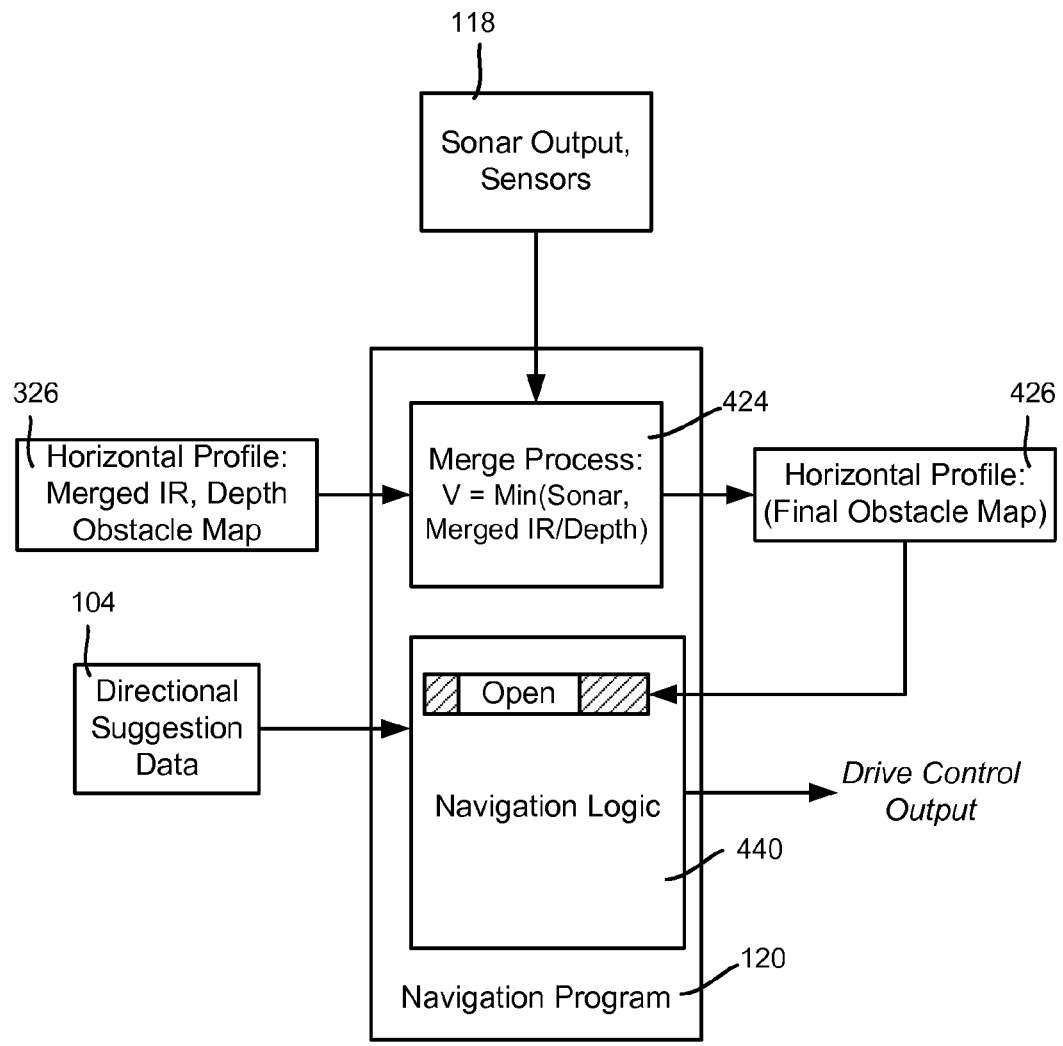
FIG. 4 is a block diagram representing example modification of horizontal profile information based upon sonar-based obstacle sensing.

FIG. 4 shows similar merge processing for sonar sensing to handle visibly transparent obstacle detection, as represented via block 424. As before, the minimum of anything sensed by the sonar overrides is fused with the sensing of the depth camera and/or the infrared sensing in the map 326. The result is a final obstacle map, which may be considered the final horizontal profile 426 in this example. Note that sonar does not detect obstacles having oblique angles very well, and thus the depth camera and sonar complement each other, with IR sensing further used if the depth camera is unable to detect close obstacles.

The sonar readings may be fused with a heuristic that takes into account the very wide field of view of the sonar along with the lack of directional feedback on the reading. In one implementation, the heuristic is that sonar readings are fused only if they are closer than where the sonar field of view intersects the floor (assuming the sonar field of view is mounted close to floor) or if they are further than where the depth camera field of view intersects the floor and the depth camera has no reading.

One the horizontal profile 426 is obtained, navigation logic 440 combines any user direction command (suggestion data) to steer the robot. If the user's requested direction is open (the robot will fit, e.g., with some extra space) as represented in the map, the navigation logic outputs drive control data to drive the robot in that direction; the width of the open space may be a factor in determining the linear drive speed and/or angular drive speed, as described below. If the direction is blocked, the robot is driven towards the midpoint of the open space as determined from the horizontal profile 426. Note that there may be multiple open spaces, and the robot may be steered to the one that most closely matches the user suggestion. Instead of the midpoint, other computations may be used, e.g., determine a point in the open space that most closely matches the angle of the user suggestion yet still provides sufficient room.

Figure 5:
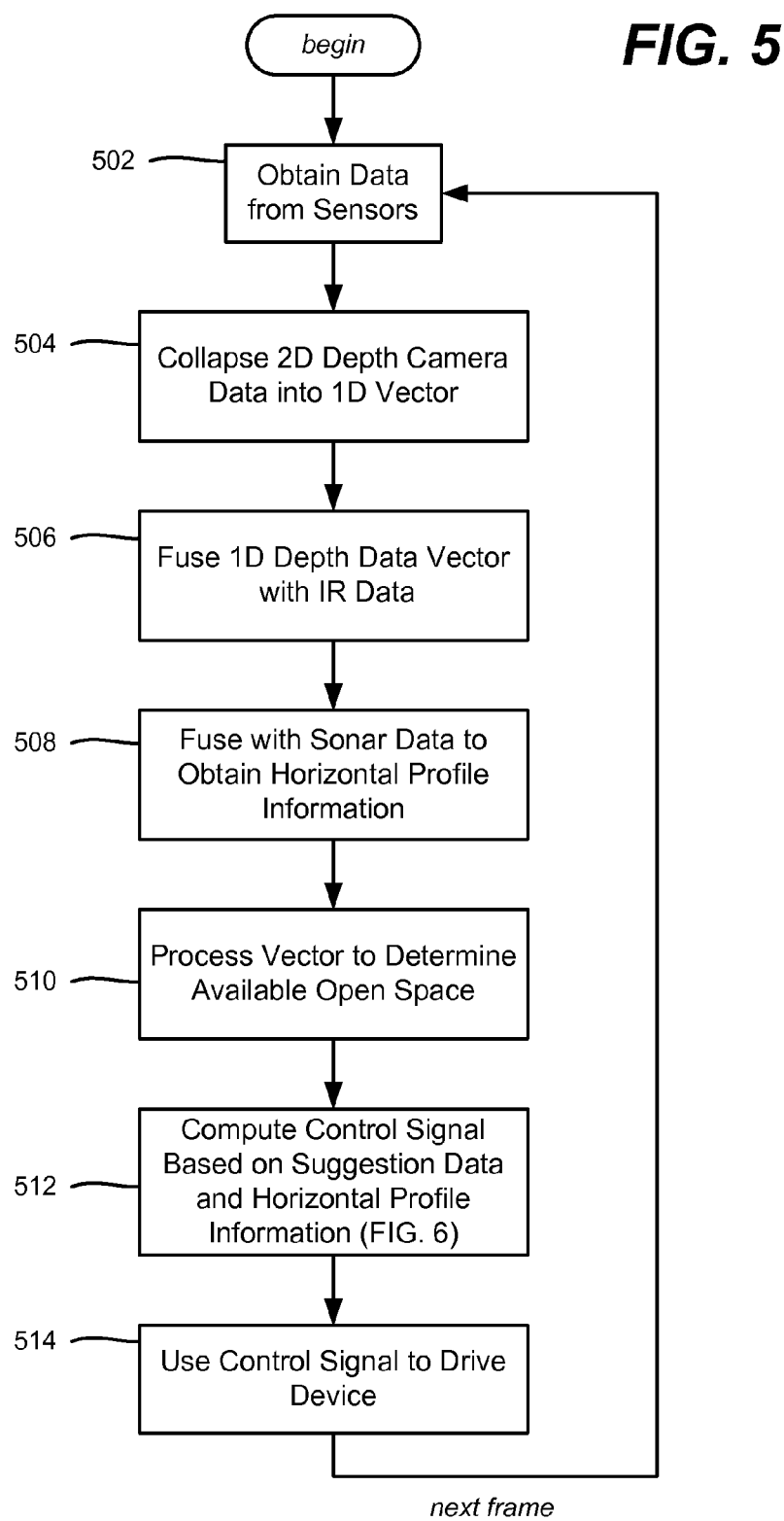
FIG. 5 is a flow diagram showing example steps directed towards navigating a mobile device through an environment with obstacles.

FIG. 5 is a flow diagram summarizing some of the above aspects and operations in example steps, beginning at step 502 where the navigation program samples data from the relevant sensors, e.g., the depth camera, IR sensors, and sonar. Step 504 represents the processing of the depth image to collapse it into a 1D vector, one element per vertical image column, as described above. Steps 506 and 508 represent fusing the readings from the IR and sonar sensors, respectively, as also described above.

At step 510, the vector is processed to determine the open space (or spaces), which may be a single open space, e.g., the largest span of available open space, keeping track of the start index and end index of the open space. This process creates an open space "midpoint" that the navigation logic may use to keep the robot navigating in an optimal, open space path.

Step 512 represents the navigation logic using the midpoint of the open space in the horizontal profile information, plus the index of where the closest obstacle occurs, to create a control signal that determines the next angular (rotational) and linear speed of the robot. The control signal is then used (step 514) to control the driving of the device linearly and/or angularly.

Figure 6:
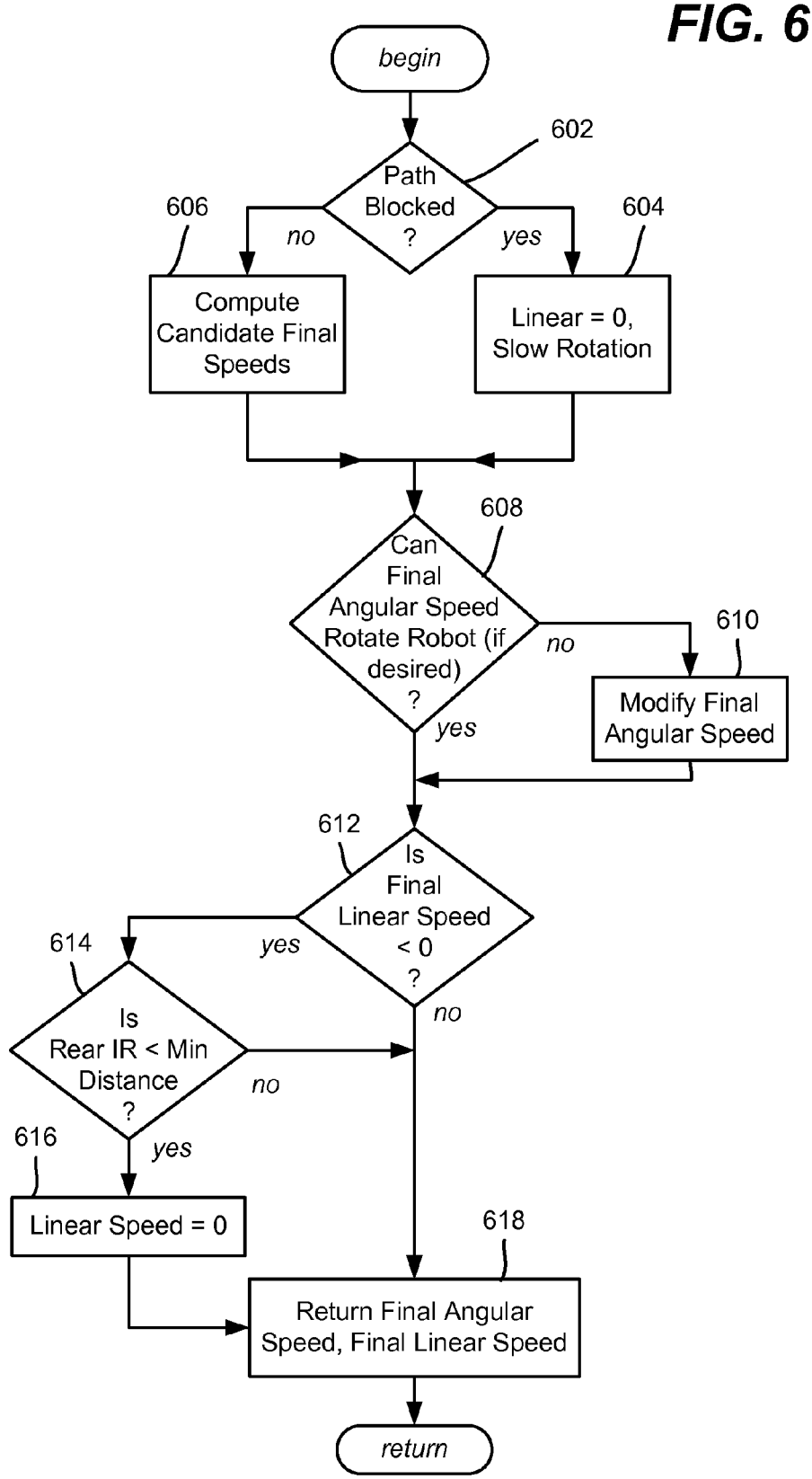
FIG. 6 is a flow diagram showing example steps for determining how to maneuver the mobile device based upon user suggestions, and collision avoidance, including when a path is blocked.

Turning to computing the control, in general, if any user suggestion has been issued (linear and/or angular), the user suggestion is merged with the control signal, overriding only when a collision is not imminent. FIG. 6 summarizes some of the logic, beginning at step 602 where the open space is evaluated to determine whether the path is blocked. If the path is blocked, at step 604 the linear speed is set to zero if the relative obstacle size is close, and the rotation is configured to be slowed, e.g., by multiplying its current angular speed by 0.25.

If the path is not blocked, step 606 computes candidate final linear and angular speeds, based upon an open space factor:

openSpaceFactor=(NormalizedWidthOfOpenSpace+ (1−RelativeObstacleSize))/2;

The linear speed is set based upon the user's suggestion:

speed=speedSuggestion*openSpaceFactor and the angular speed is likewise set based upon the user's suggestion (if non-zero) as:

angularSpeed=angularSpeedSuggestion*openSpaceFactor+ angularSpeedFromMidPointOfOpenSpace*(1− openSpaceFactor).

Note that the user may set an angular speed of zero, and if so, the angular speed is set to zero.

As can be seen, in one implementation the angular speed is affected by the speed and the open space available, e.g., the less open space the more the suggested angular speed is used, (which is usually slower so rotation is more cautiously performed).

Step 608 is directed towards making sure that final angular speed is sufficient to rotate the robot (e.g., when there is no forward motion and rotation is desired), that is, by evaluating against a default rotational speed (a known speed that is sufficient for rotation). If not, the angular speed is modified at step 610, by selecting the maximum of either the default speed or the final angular speed. Note that rotation may be in the negative (counterclockwise) direction, and thus the absolute value of the final angular speed is evaluated, with the selected angular speed multiplied by the sign of the direction to rotate in the desired direction.

FIG. 6 shows an additional detail, namely handling reverse linear speed. More particularly, the robot may back up, with a rear backup sensor (e.g., an IR beam and sensor) used to prevent collisions. Step 612 checks for whether the linear speed is negative. If so, a rear backup sensor's distance (rear IR) is evaluated at step 614 to determine whether there is an obstacle within a minimum distance. If so, the linear speed is set to zero at step 616, otherwise the robot is able to back up (note that the computed final linear speed may be slowed down when backing up, e.g., because only the rear IR sensor is sensing in that direction, for example).

Step 618 represents returning the computed final angular speed and final linear speed to the process of FIG. 5. The next frame is similarly processed, e.g., at a sensor sampling interval that makes the path smooth and also ensures a minimum stopping distance given the device maximum speed.

As can be seen, the use of a depth camera to detect obstacles across the field of view may be used to safely navigate a mobile device such as a robot through an environment having obstacles, including dynamically changing obstacles. The depth data may be processed into horizontal profile information, which may be fused with the data detected by other sensors (e.g., IR sensors and/or sonar) to obtain an obstacle map. User commands, in the form of rotational and linear speed increments, may be merged with the output of navigation logic that provides obstacle avoidance controller output, to navigate the environment in a way that provides a safe, easy to use, safe, semi-autonomous driving experience even under large latencies.

Exemplary Computing Device

As mentioned, advantageously, the techniques described herein can be applied to any device. It can be understood, therefore, that handheld, portable and other computing devices and computing objects of all kinds including robots are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
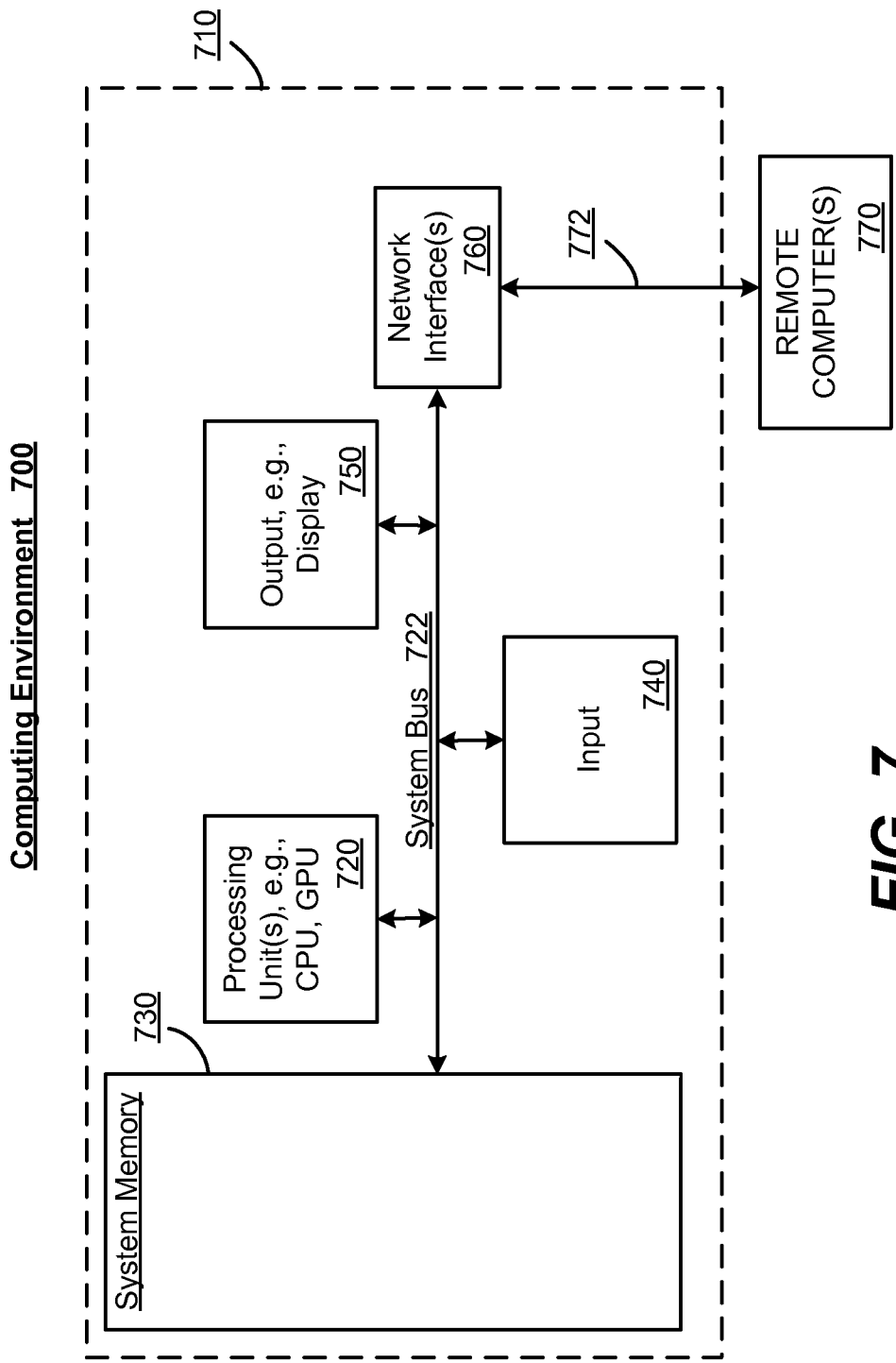
FIG. 7 is a block diagram representing an exemplary non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the exemplary computing system environment 700.

With reference to FIG. 7, an exemplary remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system comprising:
a navigation mechanism configured to receive depth data and compress the depth data into an obstacle map, wherein the obstacle map comprises a vector; and
navigation logic configured to drive a mobile device through an environment based upon the obstacle map to avoid colliding with any obstacle represented in the obstacle map.

2. The system of claim 1 wherein the navigation mechanism is further configured to receive one or more driving suggestions from a user or program, and wherein the navigation logic uses the one or more driving suggestions in conjunction with the obstacle map to drive the mobile device based upon the driving suggestions, or based upon any obstacle represented in the obstacle map, or based upon both the driving suggestions and the presence of any obstacle represented in the obstacle map.

3. The system of claim 1 wherein the mobile device comprises a robot configured to be driven at a linear speed and an angular speed.

4. The system of claim 3 wherein the navigation logic evaluates whether the angular speed is sufficient to rotate the robot if rotation is to occur, and if not, the navigation logic configured to modify the angular speed to a value that is sufficient to rotate the robot.

5. The system of claim 1 wherein the depth data comprises a two-dimensional map, and wherein the navigation mechanism compresses the two-dimensional map into an one-dimensional horizontal vector by maintaining a nearest potential obstacle in any column of pixels.

6. The system of claim 1 further comprising one or more infrared sensors, and wherein the navigation mechanism processes the depth data into the obstacle map based on a combination of the depth data and data from at least one of the one or more infrared sensors.

7. The system of claim 1 further comprising a sonar mechanism, and wherein the navigation mechanism processes the depth data into the obstacle map based on a combination of the depth data and data from the sonar mechanism.

8. The system of claim 1 further comprising one or more range detecting sensors, wherein the navigation mechanism processes the depth data into the obstacle map based on a combination of the depth data and data from at least one of the one or more range detecting sensors.

9. The system of claim 1 further comprising a sensor that detects when an obstacle is behind the mobile device.

10. The system of claim 1 wherein the navigation logic is configured to drive the mobile device to avoid colliding with any obstacle represented in the obstacle map by driving the mobile device towards an open space represented in the obstacle map.

11. The system of claim 1 wherein the navigation logic is configured to drive the mobile device to avoid colliding with any obstacle represented in the obstacle map by driving the mobile device towards a midpoint of an open space represented in the obstacle map.

* * * * *